(12) United States Patent
Bosselmann (10) Patent No.: US 8,875,558 B2
(45) Date of Patent: Nov. 4, 2014

(54) SYSTEM FOR DETERMINING EXHAUST GAS VOLUME

(75) Inventor: Thomas Bosselmann, Marloffstein (DE)

(73) Assignee: Siemens Aktiengesellschaft, Munich (DE)

( * ) Notice: Subject to any disclaimer, the term of this patent is extended or adjusted under 35 U.S.C. 154(b) by 407 days.

(21) Appl. No.: 13/498,727

(22) PCT Filed: Sep. 28, 2010

(86) PCT No.: PCT/EP2010/064340
§ 371 (c)(1),
(2), (4) Date: Mar. 28, 2012

(87) PCT Pub. No.: WO2011/039169
PCT Pub. Date: Apr. 7, 2011

(65) Prior Publication Data
US 2012/0180548 A1 Jul. 19, 2012

(30) Foreign Application Priority Data
Sep. 29, 2009 (DE) .......................... 10 2009 043 346

(51) Int. Cl.
*G01N 7/00* (2006.01)
*G01P 5/10* (2006.01)
*G01P 5/26* (2006.01)
*G01F 1/688* (2006.01)

(52) U.S. Cl.
CPC ............... *G01F 1/6884* (2013.01); *G01P 5/10* (2013.01); *G01P 5/26* (2013.01)
USPC .......................................................... 73/23.31

(58) Field of Classification Search
CPC .................................. G01F 1/6884; G01P 5/00
USPC .......................................................... 73/23.31
See application file for complete search history.

(56) References Cited

U.S. PATENT DOCUMENTS 6,494,090 B1    12/2002   Losing et al.
6,497,279 B1 *   12/2002   Williams et al. ......... 166/250.01
(Continued)

FOREIGN PATENT DOCUMENTS

DE           10251701 B4     5/2006
DE    102006012229 B3     6/2007
(Continued)

OTHER PUBLICATIONS

Latka, I. et al., "Monitoring of inhomogeneous flow distribution using fibre-optic Bragg grating temperature sensor arrays", Proceedings of Spie—The International Society for Optical Engineering—Optical Sensing II, 3. Apr. 2006, vol. 6189, XP040223478, ISSN: 0277-786X, DOI: 10.1117/12.668899; Magazine; 2006.

*Primary Examiner* — John Fitzgerald
(74) *Attorney, Agent, or Firm* — Harness, Dickey & Pierce, P.L.C.

(57) ABSTRACT

A system is disclosed, including: a plurality of Bragg gratings distributed in positions transversely to the direction of flow of an exhaust gas in an exhaust gas channel of the device; an optical wave guide structure including at least one optical wave guide and in which the Bragg gratings are embodied; a heating device arranged adjacently to the Bragg gratings and through which the Bragg gratings are subjected to heat, or a cooling device arranged adjacently to the Bragg gratings, through which the Bragg gratings are subjected to cold; at least one light source for irradiating light into the optical wave guide structure; and at least one signal processing device which determines, from light backscattered from Bragg gratings in the optical wave guide structure against its original direction of diffusion, the speed of the flow of the exhaust gas.

17 Claims, 4 Drawing Sheets

(56) References Cited

U.S. PATENT DOCUMENTS

| | | |
|---|---|---|
| 6,618,677 B1 * | 9/2003 | Brown .................... 702/13 |
| 6,769,805 B2 * | 8/2004 | Williams et al. ............. 374/137 |
| 6,986,276 B2 | 1/2006 | Gysling et al. |
| 7,302,844 B2 | 12/2007 | Birkle et al. |
| 7,336,862 B1 | 2/2008 | Xai et al. |
| 2003/0122535 A1 * | 7/2003 | Williams et al. ............. 324/107 |
| 2004/0031331 A1 | 2/2004 | Blakley et al. |
| 2006/0117844 A1 | 6/2006 | Bosselmann |
| 2006/0214098 A1 * | 9/2006 | Ramos .................... 250/256 |
| 2008/0076080 A1 * | 3/2008 | Hu et al. .................... 431/9 |
| 2009/0165551 A1 | 7/2009 | Bosselmann et al. |
| 2012/0186570 A1 * | 7/2012 | Bosselmann et al. ......... 123/703 |
| 2013/0014577 A1 * | 1/2013 | Tam et al. ................. 73/204.11 |
| 2013/0341008 A1 * | 12/2013 | Brady et al. ............. 166/250.01 |

FOREIGN PATENT DOCUMENTS

| | | |
|---|---|---|
| DE | 102006041461 A1 | 3/2008 |
| EP | 0695928 A2 | 2/1996 |
| EP | 0955524 A2 | 11/1999 |
| WO | WO 2004042326 A2 | 5/2004 |

* cited by examiner

SYSTEM FOR DETERMINING EXHAUST GAS VOLUME

PRIORITY STATEMENT

This application is the national phase under 35 U.S.C. §371 of PCT International Application No. PCT/EP2010/064340 which has an International filing date of Sep. 28, 2010, which designated the United States of America, and which claims priority to German patent application number DE 10 2009 043 346.5 filed Sep. 29, 2009, the entire contents of each of which are hereby incorporated herein by reference.

FIELD

At least one embodiment of the invention generally relates to a system for determining exhaust gas volume for a stationary or mobile device, especially a boat.

BACKGROUND

Large stationary and mobile devices, such as fossil-fuel power stations, industrial plants and/or boats are contributing in a significant way through pollution emissions (e.g. $CO_2$) to changing the climate and damaging the environment. It is thus to be expected that in the near future the exhaust gas volume of such devices will be determined, in order in this way to obtain a check on their emissions via emission certificates.

To this end the practice of determining the exhaust gas volume indirectly on the basis of operating parameters of the device, such as fuel consumption, fuel composition, combustion temperature of the device etc., is known. In such cases this is usually based on data and relationships between the operating parameters and the exhaust gas volume provided by the manufacturer or operator of a combustion device or engine. However there is no opportunity in such cases of verifying the exhaust gas volume determined by these methods in neutral, independent ways.

WO 2004/042326 discloses a measuring element for determining a flow speed of a fluid flowing around the element with a conductor for guiding an electromagnetic wave along its longitudinal extent and at least one electrical heating element arranged adjacent to the conductor, by way of which heat can be applied to the conductor. In this case an electromagnetic wave coupled into the conductor is influenced in accordance with the temperature 2 of the conductor dependent on the flow speed of the fluid.

Latka, I. et al: "Monitoring of inhomogeneous flow distributions using fibre-optic Bragg grating temperature sensor arrays" PROCEEDINGS OF SPIE—THE INTERNTIONAL SOCIETY FOR OPTICAL ENGINEERING—OPTICAL SENSING II, discloses a measuring device with fiber Bragg grating sensors for determining an inhomogeneous flow speed distribution in a flowing gas.

SUMMARY

At least one embodiment of the present invention provides an improved system for determining exhaust gas volume, which allows the exhaust gas volume for stationary and mobile devices to be determined with high precision. Furthermore at least one embodiment is directed to a method for its operation as well as an especially advantageous use of the device is to be specified.

At least one embodiment is directed to a system for determining exhaust gas volume. Advantageous embodiments are the subject matter of the subclaims. A method for operating this type of system is also disclosed. An especially advantageous use of the inventive device is also disclosed.

BRIEF DESCRIPTION OF THE DRAWINGS

The invention as well as further advantageous embodiments of the invention in accordance with the features of the subclaims will be explained below in greater detail with reference to example embodiments in the figures, in which:

DETAILED DESCRIPTION OF THE EXAMPLE EMBODIMENTS

An inventive system is disclosed for determining exhaust gas volume for a stationary or mobile device, especially a boat, comprises a number of Bragg gratings arranged distributed at prespecified positions transverse to the flow direction of an exhaust gas in an exhaust gas duct of the device, which are embodied in an optical waveguide structure including at least one optical fiber, wherein either a heating device by which heat is able to be applied to the Bragg gratings, or a cooling device by 2a which cold is able to be applied to the Bragg grating is arranged adjacent to these Bragg gratings.

When light is coupled into the optical waveguide structure that light is scattered back at the Bragg gratings arranged therein against its original direction of propagation. The spectrum of the back-scattered light is dependent in such cases on the grating constant of the grating. The grating constant in its turn is dependent on the temperature of the grating. If the Bragg gratings are now heated up by the heating device or cooled down by the cooling device, part of the heat power or the cooling power is taken away by the exhaust gas flowing past at the gratings.

The part taken away in this case is all the larger, the greater is the speed of flow of the exhaust gas. The temperature of the Bragg grating is thus influenced by the exhaust gas flowing past the Bragg gratings in the exhaust duct and this influence is all the greater, the greater is the flow speed of the exhaust gas. Depending on the temperature of the Bragg grating however the grating constant of the grating also changes. The spectrum of the back-scattered light is thus dependent on the flow speed of the exhaust gas at the Bragg grating. The volume of the exhaust gas flowing past the gratings can be derived in turn from the flow speed of the exhaust gas and the surface through which the exhaust gas flows.

It should be noted however that in large industrial and mobile devices the exhaust gas ducts can have a very large cross-sectional surface of up to several square meters. This means that it can no longer be assumed that there will be a homogeneous flow of the exhaust gas over the entire cross-section. A point type measurement would thus not be adequate. Therefore a number of Bragg gratings are arranged distributed at prespecified positions transverse to the flow direction of the exhaust gas, i.e. in a cross-sectional surface of the exhaust gas duct. This makes a distributed flow measurement of the exhaust gas over the entire cross-sectional surface of the exhaust gas duct possible, through which high accuracy in the determination of the exhaust gas volume can be achieved even with inhomogeneous exhaust gas flows.

Since optical waveguides have a very small diameter and consequently a low flow resistance, the optical fiber structure represents a negligible flow resistance for the exhaust gas flow for this type of distributed flow measurement, so that the operation of the device is not influenced by the exhaust volume determination. The exhaust gas volume can thus be determined directly and independently of manufacturer or operator information and with high precision.

In addition the mass of the exhaust gas can also be established from the flow speed determined. To do this only the density of the exhaust gas must be established. This density corresponds in a first approximation to the density of air, wherein however the temperature dependency of the density must be taken into account. The exhaust gas temperature or an exhaust gas temperature distribution can however be established in a very simple manner on the basis of the spectrum of the light scattered back at the Bragg gratings of the optical waveguide structure. This is possible by the Bragg grating not being heated or cooled for a predetermined time so that it is at the temperature of the exhaust gas.

For the determination of measured values for the flow speeds at the Bragg gratings and the further evaluations, at least one embodiment of the inventive system comprises at least one light source for beaming light into the optical waveguide structure and at least one signal processing device which, from light scattered back out of Bragg gratings into the optical waveguide structure against its original direction of propagation, establishes the flow speed of the exhaust gas along the course of the optical waveguide structure and derives the volume of exhaust gas flowing through the exhaust gas duct therefrom.

The at least one optical waveguide in this case is preferably formed by the glass fiber, since this is characterized by high resistance to physical and/or chemical stresses and especially has a high temperature resistance. Depending on application, the optical waveguide can however also be formed by a plastic fiber.

A good distribution of the Bragg gratings with good mechanical stability at the same time is possible in a constructively simple manner by the optical waveguide structure comprising a number of optical waveguide sections crossing over one another.

An especially even distribution of the Bragg gratings for an especially simple derivation of the exhaust gas volume from the individual flow speeds measured at the Bragg gratings is possible in such cases by the crossing optical waveguide sections forming an optical waveguide network. An optical waveguide network of this kind preferably has meshes each of the same size, with precisely one Bragg grating being arranged between two mesh nodes in each case.

The optical waveguide network in this case can be embodied by a single optical waveguide. This enables the hardware outlay for coupling in of light and for spectral analysis of the backscattered light to be kept especially low.

In accordance with a further advantageous embodiment of the invention the optical waveguide structure has an optical waveguide running in the shape of a spiral, in which the Bragg gratings are arranged one behind the other. A good distribution of Bragg gratings over the entire flow cross-sectional surface of the exhaust gas is also possible by this method with only a single optical waveguide.

For an especially high measurement accuracy the Bragg gratings are able to be heated up by the heating device to a temperature above the exhaust gas temperature or to be cooled down by the cooling device to a temperature below the exhaust gas temperature.

An especially even heating up or cooling down of the optical waveguide structure is possible by the heating device or the cooling device being arranged along the at least one optical waveguide of the optical waveguide structure and adjacent to said waveguide.

An especially high measurement accuracy can be achieved by a predetermined heating or cooling power being able to be output by the heating device or the cooling device per unit length of the optical waveguide.

In accordance with a constructively especially simple embodiment the heating device is formed by an electrical conductor.

To enhance the mechanical stability and to protect against aggressive exhaust gases the at least one optical waveguide and the heating device or cooling device adjacent to said waveguide can be arranged in or on a rigid support element, the shape of which defines the course of the optical waveguide in the exhaust duct. The support element preferably consists of a pipe and/or a bar with a groove and can consist of a ceramic material or a metal for example.

To allow replacement, the optical waveguide is advantageously arranged in a cavity of the carrier element and protected by the carrier element against direct contact with the exhaust gas.

It is especially advantageous for the carrier element to simultaneously form the heating device.

In at least one embodiment of an inventive method for determining the volume of an exhaust gas with a system explained above, the light is coupled into the optical waveguide structure, the flow speed of the exhaust gas along the course of the optical waveguide structure is established from light scattered back against its original propagation direction from the Bragg gratings arranged therein and the exhaust gas volume flowing through the exhaust gas duct is derived therefrom.

An especially advantageous use of at least one embodiment of the inventive system and of at least one embodiment of the inventive method lies in the measurement of exhaust gas emissions from stationary and mobile devices, especially from ships, wherein a pollutant emission of the device is established on the basis of a determined exhaust gas volume and at least one measured value for the concentration of a pollutant in the exhaust gas. The concentration of the pollutant in the exhaust gas can be measured in such cases as a point measurement taken at only one location, if there is a homogeneous distribution of the concentration of the pollutant in the exhaust gas. If the distribution of the concentration is inhomogeneous however, a distributed measurement of the concentration of the pollutant should be undertaken transverse to the flow direction at a number of points.

Figure 1:
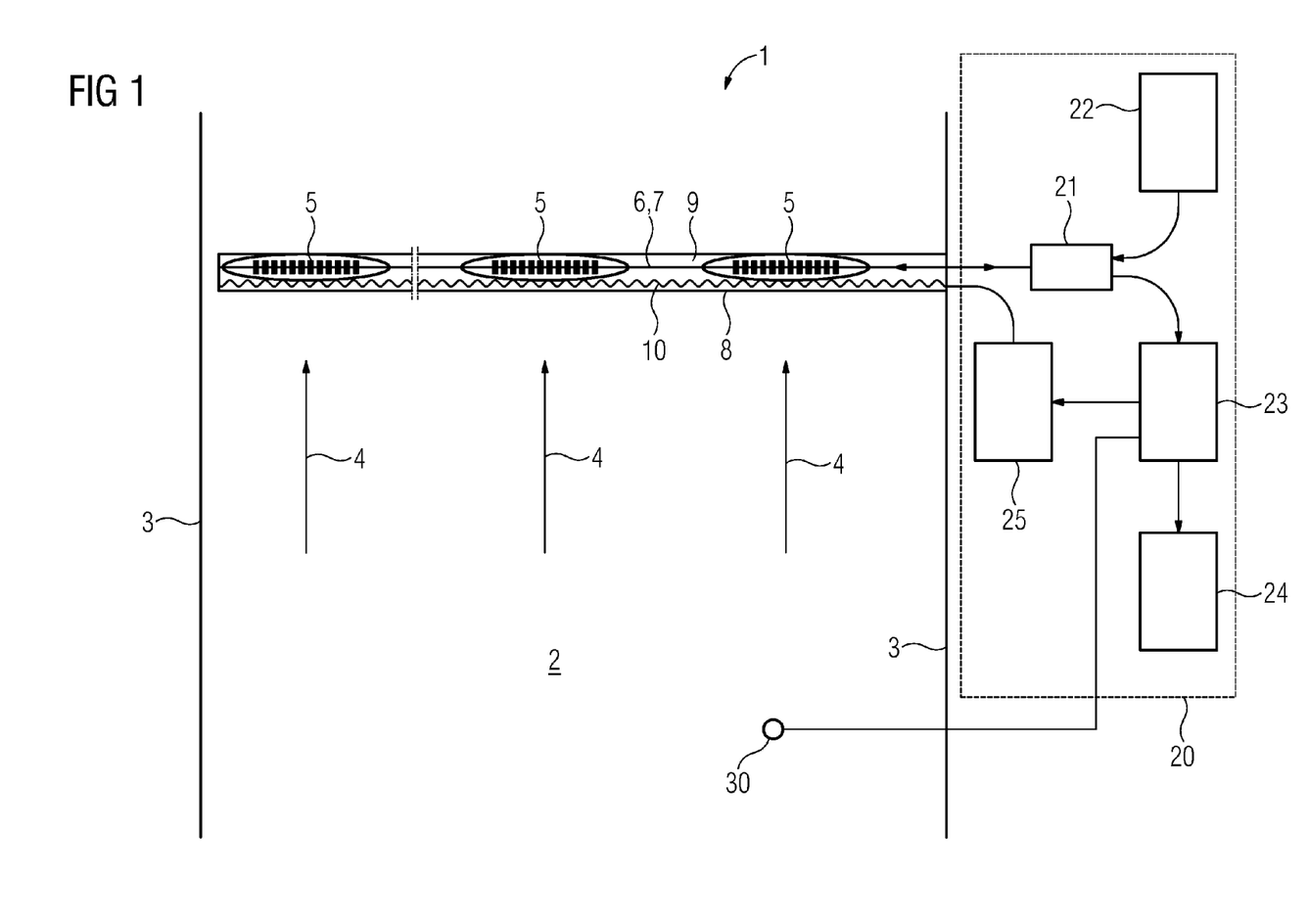
FIG. 1 shows a schematic layout of an inventive system for determining exhaust gas volume.

FIG. 1 shows the schematic structure of an inventive system for determining exhaust gas volume 1 for a large stationary or mobile device, such as a power station, an industrial plant or a boat for example. The system 1 is arranged in an exhaust gas duct 2, which is delimited to the sides by walls 3. For example this involves a funnel, exhaust gas stack or chimney of the device. This typically has a circular cross-section. However other cross-sectional geometries of the exhaust gas duct (e.g. rectangular, square, oval) are also conceivable. Arranged in the exhaust gas duct 2 transverse to the flow direction 4 of an exhaust gas distributed at predetermined positions are Bragg gratings 5, which are embodied or incorporated into an optical waveguide structure 6. The optical waveguide structure 6, in order to simplify the diagram, only comprises one optical waveguide 7 running in a straight line here. In practice it preferably comprises a number of optical waveguides however or also a single optical waveguide with an essentially non-linear course. A flexible glass fiber cable is preferably used here as the optical waveguide.

The optical waveguide 7 is arranged in a rigid carrier element in the form of a thin-walled pipe or small pipe 8 made of metal or plastic, which is arranged transverse to the direction of flow of the exhaust gas in the exhaust gas duct 2 and the form of which governs the course of the optical waveguide 7 in the exhaust gas duct 2. The optical waveguide 7 in this case is arranged, to allow replacement, in a cavity 9 of the carrier element 8 and is protected by the carrier element 8 from direct contact with the exhaust gas.

Heat is able to be applied to the Bragg gratings 5 by a heating device 10 arranged adjacent to the Bragg gratings 5. The heating device 10 is likewise arranged in the pipe 8. The heating device 10 can for example be an electrical conductor in the form of a heating wire, which is fastened along the inner wall of the pipe 8. Such an arrangement basically represents a "fiber-optic heating wire anemometer". Through the heating device 10 the optical waveguide 7 is heated evenly up to a temperature along its entire length, which is above the temperature of the exhaust gas in the area of the system 1. As an alternative the heating device can also be formed by a warm fluid which flows through the pipe 8.

The pipe or small pipe 8 can also be heated up directly by a flow through the pipe or small pipe 8 instead of via a heating wire. This heats up through the flow and then not only serves as a support element but also as a heating device for the optical waveguide 7. The small pipe 8 enables the optical waveguide 7 to be heated up evenly along its entire length to a temperature, which for example lies at 50-100° C. above the temperature of the exhaust gas in the area of the sensor unit 11. Nickel-based alloys resistant to high temperatures (such as an Inconel alloy for example) are used as a material for the small pipe, which have a temperature resistance of 600° C. and above. The small pipe 8 then for example has an outer diameter of 1.5 mm and an inner diameter of 0.5 mm. Glass fibers are even available with even greater temperature resistances.

The optical waveguide structure 6 or the optical waveguide 7 is connected to a measurement and evaluation unit 20. This comprises an optical directional coupler 21, a light source 22, a signal processing device 23, a display unit 24 and an energy source 25. The optical waveguide 7 is connected by the optical directional coupler 21 to the light source 22 and to the signal processing device 23. The directional coupler 21 couples light emitted from the light source 22 into the optical waveguide 7 and light scattered back from this to the signal processing device 23. The signal processing device 23 is connected downstream from the display unit 24. The energy source 25 serves to supply energy to the heating device 10. The energy source 25 can be activated from the signal processing device 23. On activation of the energy source 25 the heating device 10 heats up the optical waveguide 7 along with the Bragg gratings 5 evenly along its entire length.

The Bragg gratings 5 are embodied along the optical waveguide 7 in said waveguide at predetermined positions with the same or different grating periods from one another. If Bragg gratings 5 with different grating periods are used, then preferably a wideband-emitting light source 22 is used. If on the other hand Bragg gratings with the same or essentially the same grating periods are used, then preferably a pulsed monochromatic light source 22 is used. The Bragg gratings 5 consist of the periodic sequence of disc-shaped areas which exhibit a diffraction index different from the normal diffraction index of a core of the optical waveguide 7.

If light with a wideband distribution of the intensity over the wavelength is beamed into Bragg gratings 5 which for example exhibit different grating periods, a small part of the light is scattered back at the Bragg gratings and this is done with a respective characteristic spectral intensity distribution which depends on the grating period of the respective grating.

A local temperature change of the optical waveguide 7 in the area of a Bragg grating 5 leads to a local length expansion or contraction and thus to a change in the grating period, which results in a shift in the spectral intensity distribution of the back scattered light. The degree of this shift is a measure of the change in length and thus of the change in temperature.

For exhaust gas volume measurement by way of the optical waveguide structure a temperature measurement of the Bragg grating 5 is initially undertaken. From the temperature of the Bragg grating 5 a deduction is then made about the flow speed of the exhaust gas in the exhaust gas duct 2 and from this about the exhaust gas volume.

For this purpose the energy source 25 is activated and outputs power to the heating device 10, which leads to a heating up of the optical waveguide 7 in relation to its environment and especially also in relation to the exhaust gases. The optical waveguide 7 is heated up in this case to a temperature which—without the exhaust gas flowing past it—would lie above the temperature of the exhaust gas flowing past the optical waveguide 7. Via the exhaust gas flowing past the Bragg gratings 5 however a part of the heating power output by the heating device 10 is diverted. In this case the more heating power is diverted the greater is the flow speed of the cooler exhaust gas flowing past.

The signal processing device 23 contains a spectral analyzer for determining the spectral distribution of the light scattered back from the individual Bragg gratings 5 and a processing device which determines the degree of the respective shift in relation to a reference location and converts it into a temperature change compared to a reference temperature at which the spectral distribution has the reference location. This is done for each individual Bragg grating 5 so that in this way the distribution of the temperature along the entire optical waveguide 7 at the positions provided with the Bragg gratings 5 is obtained.

On the basis of these temperatures the flow speed of the exhaust gas along the entire optical waveguide 7 can be determined in the signal processing device 23 at the locations provided with Bragg gratings 5 and the exhaust gas volume flowing through the exhaust gas duct 2 can be derived from this and output to the display unit 24. The overall cross-sectional surface of the exhaust gas duct in the area of the optical waveguide structure 6 is distributed in this case in part surfaces around the different Bragg gratings 5. From the flow speed measured with a Bragg grating 5 of a part surface and the surface of the part surface the exhaust gas volume flowing through the part surface can be determined. The sums of the exhaust gas (part) volumes flowing through all part surfaces then produce the total exhaust gas volume flowing through the exhaust gas duct.

The precision can be increased in such cases even more if the flow speed between the different measurement points is interpolated again and thus the flow speed distribution over the part surfaces is taken into account. There is thus no point-type flow measurement but a measurement distributed over the entire flow cross-sectional surface. Even with cross-sectional surfaces of the exhaust gas duct 2 of several square meters, this makes possible a high precision in the determination of the exhaust gas volume without there being any perceptible change in the flow resistance in the exhaust gas duct 2. With smaller cross-sectional surfaces of the exhaust gas duct 2 on the other hand, a single Bragg grating can already be sufficient for exhaust gas volume determination, i.e. a single optical waveguide with only a single Bragg grating is then already sufficient for exhaust gas volume determination.

When Bragg gratings with the same or essentially the same grating periods are used, the signal processing device 23 also has evaluation electronics which detects and evaluates the delay time of the backscattered light with altered spectral intensity distribution. To implement the time-resolved measurement there can be recourse to conventional OTDR (Optical Time Domain Reflectometry) technology, as is used in communication technology, for assessing the quality of signal links.

Instead of the heating device 10, a cooling device can be used through which cold can be applied to the optical waveguide 7 and the Bragg gratings 5 incorporated therein. A fluid flowing through the pipe 8 can for example be used as a coolant. The Bragg gratings 5 can then be cooled to a temperature—without the exhaust gas flowing past—which would lie below the temperature of the exhaust gas. However a part of the cooling power output by the cooling device 19 is diverted via the exhaust gas flowing past the Bragg gratings. In such cases the greater the flow speed of the warm exhaust gas flowing past the more cooling power is diverted. In this way too the flow speeds can be determined from the temperatures measured at the Bragg gratings and the exhaust gas volume can be derived therefrom in the signal processing device 23.

Especially advantageously this system 1 also includes a sensor 34 for determining the concentration of a pollutant such as Co2, NOx or sulfur in the exhaust gases for example. The sensor 30 is also connected to the signal processing device 23. Thus a pollutant emission of the device can be determined in the signal processing device 23 with the aid of a determined exhaust gas volume and a measured value for the concentration of the pollutant in the exhaust gas and can be output on the display unit 24. In this way an exhaust gas emission from stationary and mobile devices, especially from boats, can be measured with little constructional outlay. The concentration of the pollutant in the exhaust gas can either be measured at specific points or distributed by way of commercially available measurement devices (e.g. via laser absorption spectroscopy).

It is advantageous for the heating power to be output by the heating device 10 to be adjustable. The heating power can in this case be adapted to the exhaust gas temperature so that temperature differences are set in the optical waveguide 7 that are able to be safely detected by the signal processing device 23, without a disproportionate amount of power being used. The setting can be made automatically by power injected from the energy source 25 into the heating device 10, starting from a relatively low initial value and being increased step-by-step until such time as the signal processing device 23 identifies clear temperature differences along the optical waveguide 7.

The resolution and thus the accuracy of the exhaust gas volume measurement is predetermined by the number of Bragg gratings 5 per surface unit of the exhaust gas duct and the positions of the Bragg gratings 5 along the optical waveguide 7 and is able to be adapted to the requirements of the respective application by a suitable design.

In addition the mass of the exhaust gas can also be established from the flow speeds determined. For this only the density of the exhaust gas must be established. This density corresponds in a first approximation to the density of air, wherein however the temperature dependency of the density must be taken into consideration. The exhaust gas temperature or an exhaust gas temperature distribution can also be established very simply on the basis of the spectrum of the light scattered back at the Bragg gratings 5 of the optical waveguide structure 6. This is possible in that the Bragg gratings 5 are not heated or cooled for a predetermined time so that they assume the temperature of the exhaust gas.

The measurement and evaluation unit 20 can be arranged in the area of the end of the exhaust gas duct 2 outside of the exhaust gas duct 2 or for example also at the foot of the chimney 3 or in an automation control center and be connected via cables to the optical waveguide structure 6 and the heating device 10.

An arrangement of the Bragg gratings distributed in the exhaust gas duct 2 with good resolution can be achieved by different optical waveguide structures. Examples of this are shown in FIGS. 2 to 6, wherein, to simplify the diagram, only the optical waveguide structure and the Bragg gratings are shown, the associated heating devices 10 and support elements 8 being omitted however.

Figure 2:
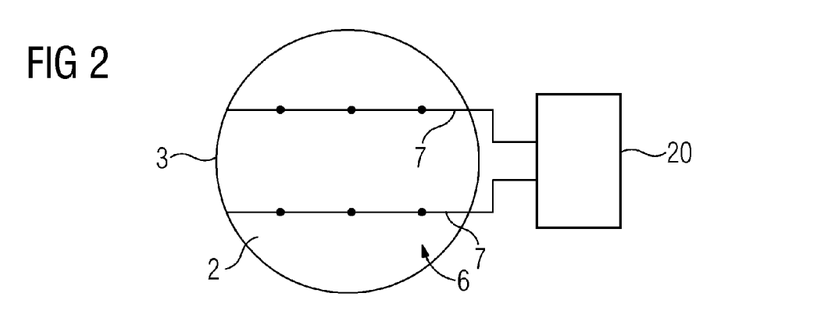
FIG. 2 shows an overhead view of an optical waveguide structure which consists of two optical waveguides running in parallel to one another.

As is shown in the overhead view in FIG. 2, the optical waveguide structure 6 can for example consist of two optical waveguides 7 running in parallel to one another, which are arranged in a surface at right angles to the flow direction 4 of the exhaust gas in the exhaust flow duct 2 and are incorporated into the Bragg grating 5. For this purpose the measurement and evaluation unit 20 has one light source 22 and a directional coupler 21 in each case for each of the optical waveguides 7 as well as a common signal processing device 23. The optical waveguide structure 6 can alternatively, instead of being represented by two optical waveguides 7, also be embodied by just one single optical waveguide 7 with two optical waveguide sections arranged in parallel to one another, wherein a single light source 22 and a single directional coupler 21 are then sufficient.

Figure 3:
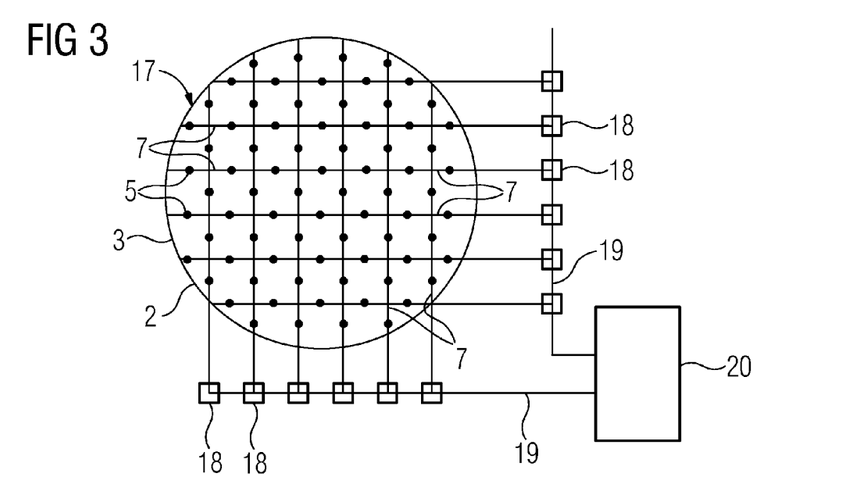
FIG. 3 shows an overhead view of an optical waveguide structure embodied as an optical waveguide network.

In accordance with FIG. 3 the optical waveguide structure 6 can also consist of a number of optical waveguides 7 crossing one another through which an optical waveguide network 17 is embodied. The optical waveguide network 17 preferably has meshes each of the same size. In each case precisely one Bragg grating 5 is arranged between two mesh nodes. The individual optical waveguide 7 can each be connected separately to the measurement and evaluation unit 20. As an alternative—as shown—a number of optical waveguides 7 in each case can be connected via a respective multiplexer 18 to a central connecting lead 19, which for its part is connected to the measurement and evaluation unit 20.

Figure 4:
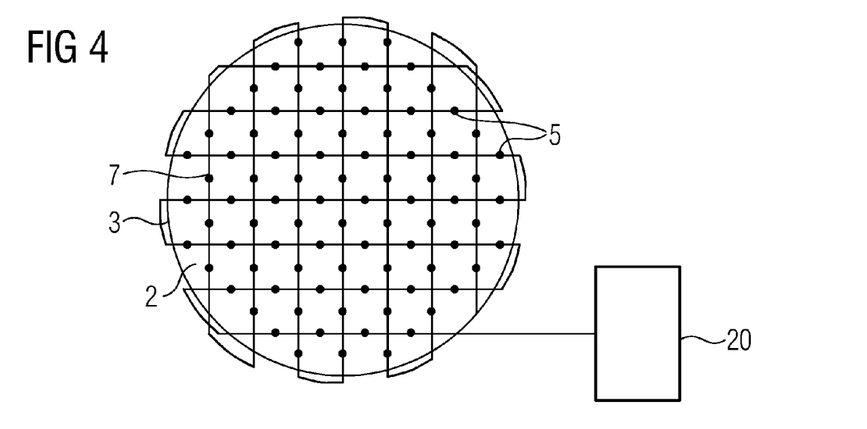
FIG. 4 shows an overhead view of an optical waveguide structure embodied as an optical waveguide network, wherein the optical waveguide network is embodied by a single optical waveguide.

As shown in FIG. 4 the optical waveguide network 17 can be embodied by a single optical waveguide 7, which runs alternately from one side of the exhaust gas duct 2 to an opposite side.

The network structures shown in FIGS. 3 and 4 allow an especially even distribution of the Bragg gratings and thus the exhaust gas volume to be determined especially simply and precisely.

Figure 5:
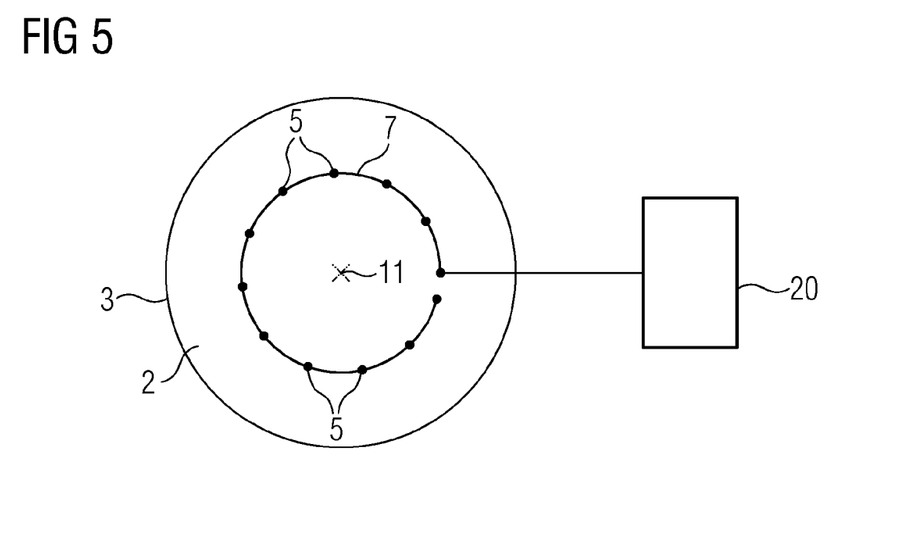
FIG. 5 shows an overhead view of an optical waveguide structure which consists of an optical waveguide with a circular course.

As shown in FIG. 5, the optical waveguide structure 6 can also consist of a single optical waveguide 7 with a circular course which is arranged radially to the central axis 11 of the exhaust gas duct 2 in a surface at right angles to the direction of flow 4 of the exhaust gas in the exhaust gas duct 2 and in which the Bragg gratings 5 are arranged one behind the other.

Figure 6:
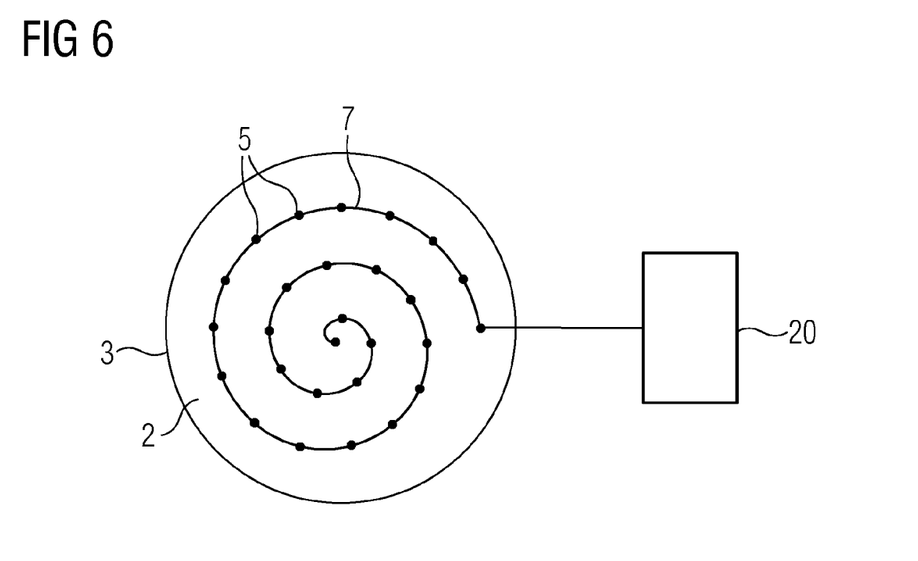
FIG. 6 shows an overhead view of an optical waveguide structure which consists of an optical waveguide with a spiral course.

Instead of including a single optical waveguide 7 with a circular course, the optical waveguide structure 6—as shown in FIG. 6—can also consist of a single optical waveguide 7 with a spiral-shaped course, which is arranged in a surface at right angles to the direction of flow 4 of the exhaust gas in the exhaust gas duct 2 and in which the Bragg gratings 5 are arranged one behind the another.

There are also different options regarding the design and arrangement of the heating device in relation to the optical waveguide(s) with Bragg gratings incorporated therein. In an arrangement shown in cross-section in FIG. 7 the heating device consists of two heating elements 10a, 10b (e.g. an outward conductor and a return conductor of the heating wire) between which an optical waveguide 7, e.g. a glass fiber, is arranged. The entire arrangement is embedded in a ceramic material 16 which in its turn is enclosed by a passivating jacket 12.

Figure 8:
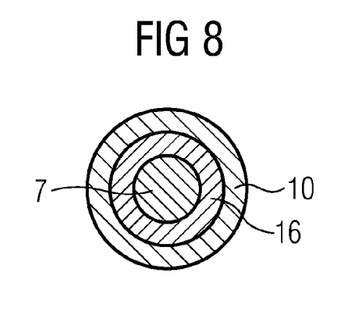
FIG. 8 shows an optical waveguide surrounded by a ceramic material.

In a design shown in FIG. 8 an optical waveguide 7, e.g. in the form of a glass fiber, is surrounded by a ceramic material 16. This is in turn enclosed all around by the heating device 10 which simultaneously forms a jacket.

Figure 9:
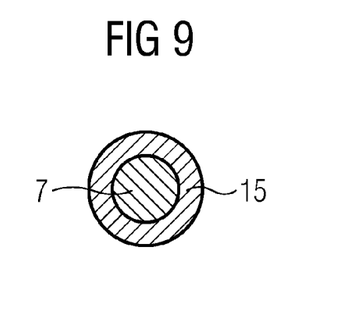
FIG. 9 shows an optical waveguide vapor-coated with a metal coating and FIG. 10 shows a heating device with two heating wires which are connected electrically in series.

In a further design shown in FIG. 9 the glass fiber 7 has a vapor-deposited metal coating 15 which simultaneously forms a jacket as well as the heating device. This embodiment is characterized by an elasticity through which the inventive system 1 can be adapted especially simply to requirements in its spatial extent to an exhaust gas duct. In addition this embodiment is characterized by an especially simple manufacturing process in which the optical waveguide 7 is coated with the desired electrical conductor in a coating process of a conventional, known type.

Figure 7:
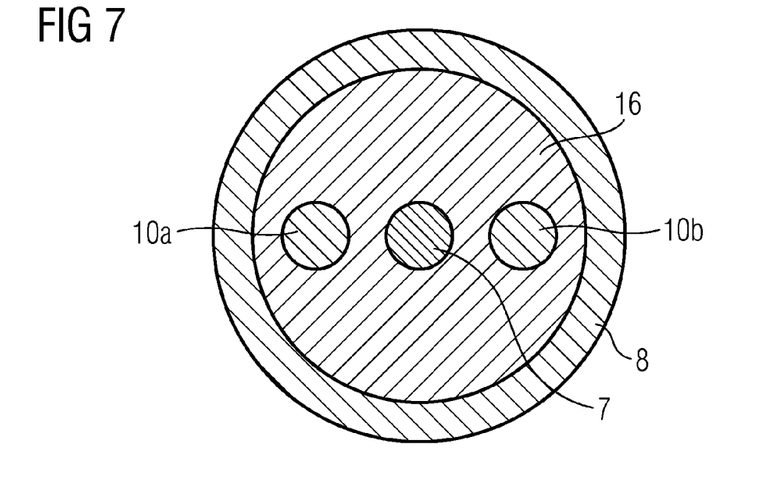
FIG. 7 shows a heating device with two heating elements, between which an optical waveguide is arranged.

The heating devices 10 or heating elements 10a, 10b used in the embodiments of FIGS. 7-9 are preferably made from a metal or a metal alloy. Depending on the physical and/or chemical stresses, steel, copper, aluminum, bronze, konstantan or the like can be used. For high-temperature applications a coating with a metal such as tungsten or the like is to be preferred. For applications at low temperatures in a chemically-aggressive environment conductive polymers can also be used for example. In addition the embodiment in accordance with FIG. 9 is characterized in that it has an especially low thermal capacitance compared to the two other versions, so that changes in the exhaust gas volume over time can be detected rapidly.

In the example embodiments shown the heating device 10 has a constant electrical resistance coating in each case. In particular the resistance coating in the operating temperature range is largely independent of the temperature. An application of a constant current or an alternating current with constant effective value to the heating device 10 thus leads to an even generation of heat over the length of the heating device 10, so that the optical waveguide structure has heat applied to it evenly over its entire extent.

Figure 10:
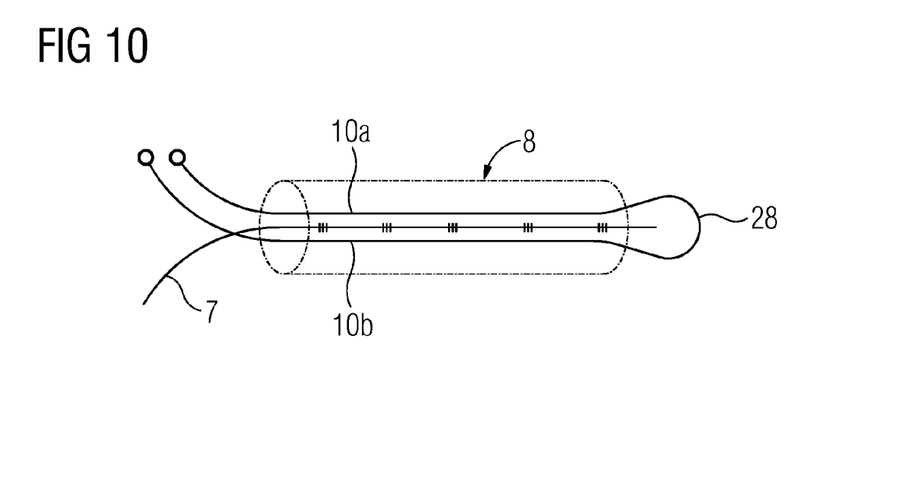

FIG. 10 shows a schematic view of the system 1 from FIG. 1 with a heating device 10 including two heating wires 10a, 10b, which are connected to each other in series at one end of a support element 8 via an electrical connection 28. In this embodiment the system 1 is therefore advantageously able to be contacted at one end. The second end is freely available, meaning that especially simple installation and/or handling can be achieved.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A system for determining exhaust gas volume for a stationary or mobile device, comprising:
a number of Bragg gratings arranged distributed at specified positions transverse to a direction of flow of an exhaust gas in an exhaust gas duct of the device;
an optical waveguide structure, in which the Bragg gratings are embodied, the optical waveguide structure including at least one optical waveguide;
at least one light source configured to beam light into the optical waveguide structure;
at least one signal processing device, configured to establish a speed of flow of the exhaust gas along a course of the optical waveguide structure from light scattered back from the Bragg gratings in the optical waveguide structure opposite to its original direction of propagation; and
at least one of
a heating device, arranged adjacent to the Bragg gratings, through which the Bragg gratings are heatable to a temperature above the exhaust gas temperature, wherein a heat power to be output by the heating device is able to be adapted to the exhaust gas temperature, and
a cooling device arranged adjacent to the Bragg gratings by which the Bragg gratings are coolable to a temperature below the exhaust gas temperature, the at least one signal processing device being configured to determine a flowing exhaust gas volume from the established flow speed of the exhaust gas determined along the course of the optical waveguide structure.

2. The system as claimed in claim 1, further comprising a sensor to determine a concentration of a pollutant in the exhaust gas.

3. The system as claimed in claim 1, wherein the optical waveguide structure includes an optical waveguide running in a spiral shape in which the Bragg gratings are arranged one behind the other.

4. The system as claimed in claim 1, wherein the heat power of the heating device, starting from an initial value, is able to be automatically increased step-by-step until the signal processing device identifies unique temperature differences along at least one optical waveguide, or that the cooling device comprises at least one pipe in which at least on optical waveguide is arranged and around which a coolant is able to flow.

5. A method of using the system of claim 1 for measuring exhaust gas emissions from stationary and mobile devices, comprising:
establishing a pollutant emission of the device on the basis of an exhaust gas volume determined and at least one measured value for a concentration of a pollutant in the exhaust gas.

6. The system of claim 1, wherein the system is for determining exhaust gas volume for a boat.

7. The system as claimed in claim 1, wherein the heating device or cooling device is arranged along the at least one optical waveguide of the optical waveguide structure and adjacent to said waveguide.

8. The method as claimed in claim 7, wherein a level of heating or cooling power per unit length of the optical waveguide is able to the output by the heating device or cooling device.

9. The system as claimed in claim 1, wherein the Bragg gratings have different grating periods along at least one optical waveguide and a broad spectrum of light is able to be beamed into these optical waveguides via a light source, or that the Bragg gratings have the same grating periods along at least one optical waveguide, pulsed, monochromatic light is able to be beamed into these optical waveguides by way of a light source and a delay time of the backscattered light is able to be detected and evaluated by way of a signal processing device.

10. The system as claimed in claim 9, wherein the carrier element simultaneously forms the heating device.

11. The system as claimed in claim 1, wherein the optical waveguide structure includes optical waveguide sections crossing each other.

12. The system as claimed in claim 11, wherein an optical waveguide network is embodied by the optical waveguide sections crossing one another.

13. The system as claimed in claim 12, wherein the optical waveguide network is embodied by a single optical waveguide.

14. The system as claimed in claim 1, wherein the at least one optical waveguide and the heating device are arranged in or on a rigid support element, the form of which defines the course of the optical waveguide in the exhaust gas duct.

15. The system as claimed in claim 14, wherein the optical waveguide is arranged in a replaceable fashion in a cavity of the support element and is protected from direct contact with the exhaust gas by way of the support element.

16. The system as claimed in claim 14, wherein the carrier element simultaneously forms the heating device.

17. A method for determining a volume of exhaust gas of a stationary or mobile device, comprising:
 at least one of
  heating up Bragg gratings to a temperature above an exhaust gas temperature, a heat power to be emitted by a heating device being adapted during the heating to the exhaust gas temperature, or
  cooling down the Bragg gratings to a temperature below the exhaust gas temperature;
 establishing a flow speed of the exhaust gas along the course of an optical waveguide structure, when coupling light into the optical waveguide structure, by light scattered back from the Bragg gratings against its original direction of propagation; and
 determining the volume of the exhaust gas flowing through the exhaust gas duct from the established flow speed.

\* \* \* \* \*